(12) United States Patent
Moritz

(10) Patent No.: US 11,020,902 B2
(45) Date of Patent: Jun. 1, 2021

(54) APPARATUS FOR ADDITIVELY MANUFACTURING OF THREE-DIMENSIONAL OBJECTS

(71) Applicant: CONCEPT LASER GMBH, Lichtenfels (DE)

(72) Inventor: Bernhard Moritz, Bad Staffelstein (DE)

(73) Assignee: CONCEPT LASER GMBH, Lichtenfels (DE)

(*) Notice: Subject to any disclaimer, the term of this patent is extended or adjusted under 35 U.S.C. 154(b) by 168 days.

(21) Appl. No.: 16/104,490

(22) Filed: Aug. 17, 2018

(65) Prior Publication Data

US 2019/0061247 A1 Feb. 28, 2019

(30) Foreign Application Priority Data

Aug. 25, 2017 (EP) .................................... 17187998

(51) Int. Cl.
*B29C 64/245* (2017.01)
*B33Y 30/00* (2015.01)
(Continued)

(52) U.S. Cl.
CPC ............ *B29C 64/245* (2017.08); *B22F 10/00* (2021.01); *B29C 64/135* (2017.08);
(Continued)

(58) Field of Classification Search
CPC ....... B33Y 10/00; B33Y 30/00; B22F 3/1055; B22F 2003/1056; B22F 2003/1057;
(Continued)

(56) References Cited

U.S. PATENT DOCUMENTS 6,554,600 B1 4/2003 Hofmann et al.
2012/0291701 A1* 11/2012 Grasegger ............. B29C 64/245
118/300
(Continued)

FOREIGN PATENT DOCUMENTS

CN 205573048 U 9/2016
CN 107000061 A 8/2017
(Continued)

OTHER PUBLICATIONS

European Search Report Corresponding to Application No. 17187998 dated Feb. 23, 2018.
(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

Apparatus (1) for additively manufacturing of three-dimensional objects by means of successive layerwise selective irradiation and consolidation of layers of a build material which can be consolidated by means of an energy beam, with a carrier device (2) with at least one carrier element (3) for carrying build material and/or at least one object to be built and a driving unit (4) configured to drive the at least one carrier element (3), wherein the driving unit (4) is coupled with the carrier element (3) via at least one coupling means (5), wherein at least one securing unit (10) is provided that is configured to secure the coupling of the carrier element (3) with the at least one coupling means (5), wherein the securing unit (10) is configured to apply a securing force directed axially on the coupling means (5).

11 Claims, 1 Drawing Sheet

(51) Int. Cl.
   *B29C 64/153* (2017.01)
   *B29C 64/135* (2017.01)
   *B29C 64/232* (2017.01)
   *B22F 10/00* (2021.01)
   *B33Y 10/00* (2015.01)
   *B29C 64/227* (2017.01)
   *B29C 64/268* (2017.01)
   *B22F 10/10* (2021.01)
   *B23K 26/08* (2014.01)
   *B23K 26/082* (2014.01)
   *B29C 64/20* (2017.01)

(52) U.S. Cl.
   CPC .......... *B29C 64/153* (2017.08); *B29C 64/227* (2017.08); *B29C 64/232* (2017.08); *B29C 64/268* (2017.08); *B33Y 10/00* (2014.12); *B33Y 30/00* (2014.12); *B22F 10/10* (2021.01); *B23K 26/08* (2013.01); *B23K 26/082* (2015.10); *B23K 26/083* (2013.01); *B23K 26/0823* (2013.01); *B23K 26/0853* (2013.01); *B23K 26/0861* (2013.01); *B29C 64/20* (2017.08)

(58) Field of Classification Search
   CPC ..... B22F 2003/1058; B22F 2003/1059; B23K 26/08; B23K 26/082; B23K 26/0823; B23K 26/083; B23K 26/0853; B23K 26/0861; B29C 64/20; B29C 64/245; B29C 64/153; B29C 64/232; B29C 64/227; B29C 64/135; B29C 64/268
   USPC .............................................. 425/174.4, 375
   See application file for complete search history.

(56) References Cited

U.S. PATENT DOCUMENTS

2016/0318253 A1    11/2016  Barnhart
2017/0239725 A1*   8/2017  Ufton .................... B33Y 30/00

FOREIGN PATENT DOCUMENTS

| | | | |
|---|---|---|---|
| EP | 0734842 | A1 | 10/1996 |
| EP | 1037739 | A1 | 9/2000 |
| JP | 2007/270227 | A | 10/2007 |
| JP | 2013/163829 | A | 8/2013 |
| JP | 2015/155188 | A | 8/2015 |
| JP | 2017/538030 | A | 12/2017 |
| WO | 2014020086 | A2 | 2/2014 |
| WO | 2016055523 | A1 | 4/2016 |

OTHER PUBLICATIONS

European Search Report Corresponding to Application No. 17187998 dated Mar. 6, 2018.
Machine Translated Japanese Office Action Corresponding to Application No. 2018026583 dated Dec. 9, 2018.
Machine Translated Japanese Office Action Corresponding to Application No. 2018026583 dated Sep. 3, 2019.
Machine Translated Chinese Office Action Corresponding to Application No. 201711128301 dated May 27, 2020.

* cited by examiner

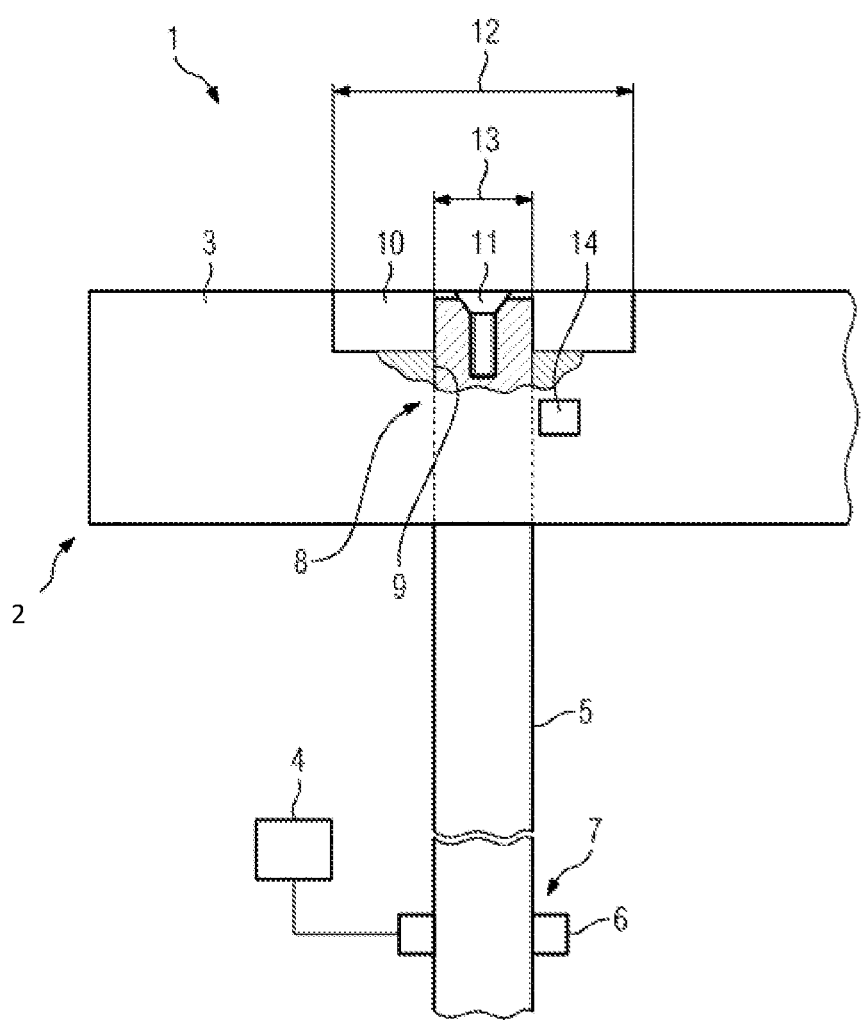

APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 187 998.4 filed Aug. 25, 2017, the contents of which is incorporated herein by reference in its entirety as if set forth verbatim.

FIELD OF THE INVENTION

The invention relates to an apparatus for additively manufacturing of three-dimensional objects by means of successive layerwise selective irradiation and consolidation of layers of a build material which can be consolidated by means of an energy beam, with a carrier device with at least one carrier element for carrying build material and/or at least one object to be built and a driving unit configured to drive the at least one carrier element, wherein the driving unit is coupled with the carrier element via at least one coupling means.

BACKGROUND

Apparatuses of the like are known from prior art, comprising an irradiation device configured to generate an energy beam to selectively irradiate and thereby consolidate a build material. The build material typically is carried by a carrying element that is assigned to a carrier device in that a build plane is formed that can be selectively irradiated by the energy beam. During the manufacturing process several layers of build material are irradiated in succession, wherein after each irradiation step a layer of fresh build material is applied on the build plane and on the previously applied and/or irradiated layer of build material.

Thus, after the irradiation of a layer is finished, the carrier element is moved in Z-direction, i.e. downwards, in that space for the fresh layer of build material is provided. To allow for a movable arrangement of the carrier element, the carrier device comprises a driving unit coupled with the carrier element via at least one coupling means, for example a spindle. By means of the driving unit it is possible to drive the coupling means and thereby move the carrier element that is coupled with the coupling means.

Further, it is known from prior art to couple the coupling means with the carrier element by clamping the coupling means in a corresponding recess in the carrier element. Disadvantageously, the coupling means may be decoupled, i.e. pulled out of the recess, e.g. due to friction between the carrier element and a housing of the apparatus, wherein the a corresponding friction force on the carrier element may exceed a clamping force resulting in a decoupling of the coupling means from the carrier element. The decoupling of the coupling means from the carrier element leads to a loss of mobility of the carrier element. Thus, a failure of the apparatus may occur.

Therefore, it is an object to provide an apparatus, wherein the fail safety is improved.

SUMMARY OF THE INVENTION

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that at least one security unit is provided that is configured to secure the coupling of the carrier element with the at least one coupling means, wherein the securing unit is configured to apply a securing force directed axially on the coupling means. Deviant from prior art, the invention suggests to apply a securing force that is directed axially on the coupling means instead of clamping the coupling means to the carrier element, wherein the clamping force typically is applied in radial direction.

The securing force that acts axially on the coupling means therefore, counteracts the force that is applied on the coupling means, e.g. due to friction, and is directed to pull the coupling means out of the carrier element, e.g. a recess in the carrier element. Thus, the coupling of the coupling means with the carrier element is improved, since a securing unit is provided applying a securing force that directly counteracts a force that leads to the decoupling of the coupling means from the carrier element. Hence, the securing unit assures that the coupling means is not pulled out of the carrier element therefore, the coupling between the coupling means and the carrier element is secured. The carrier device can be assigned to different types of apparatuses used for additive manufacturing processes as described before, for example the carrier device may be assigned to a build module, wherein the carrier device carries the build material and the object that is currently build, in particular the carrier device can carry a build plate on which the build material layers are applied to be selectively irradiated by the energy beam. It is also possible to assign the carrier device to a dose module, which provides build material for the additive manufacturing process. Further, the security unit may provide a sealing function, wherein the securing unit seals two rooms adjacent to the security unit.

According to an advantageous embodiment of the apparatus, the coupling means comprises a driving region and a holding region, wherein the coupling means is configured to interact with the driving unit in the driving region and to interact with the carrier element in the holding region. In other words, the driving unit interacts with the coupling means in the driving region, i.e. applies a driving force on the coupling means in the driving region. The holding region is referred to as the region in which the coupling element is coupled with the carrier element, for example the region of the coupling means that is received in a recess in the carrier element. In particular, the driving region and the holding region are arranged in different positions of the coupling means, for example a driving region is arranged around a bottom end of the coupling means, whereas the holding region is arranged around a top end of the coupling means.

The apparatus can further be improved in that the securing unit is configured to mechanically secure the position of the coupling element relative to the carrier element. The securing unit therefore, fixates the coupling element and the carrier element relative to one another and therefore, ensures that a driving force applied on the coupling means is transferred on the carrier element via the coupling of the coupling means with the carrier element. Thus, it can be assured that the position of a build plate coupled with or contained in the carrier device can be positioned in a defined manner as the carrier element can be driven together with the coupling means.

Advantageously, the coupling means is partly arranged in an opening in the carrier element. According to this embodiment, a part of the coupling means is arranged in an opening in the carrier element, in particular the holding region of the coupling means is received in an opening in the carrier element. Hence, the carrier element provides an opening in which the carrier element can be inserted. The opening additionally provides a guiding of the coupling means and fixates a lateral relative position (in particular in X- and Y-direction).

The apparatus can further be improved in that the coupling means protrudes the opening of the carrier element, wherein the securing unit is arranged adjacent to the opening in the holding region of the coupling means, wherein the driving region is arranged on the other side of the opening and the securing unit is configured to secure the coupling means from being pulled out of the opening in a direction of the driving region.

Thus, the driving region and the holding region are arranged in different positions of the coupling means, wherein the coupling means protrudes the opening of the carrier element with the holding region. The securing unit is arranged in the holding region of the coupling means adjacent to the opening, wherein the securing unit is arranged on the opposite side of the opening with respect to the driving region. The securing unit therefore, assures that the coupling means cannot be pulled out of the opening.

Advantageously, a physical and/or geometrical dimension, in particular a diameter, of the securing unit is larger than the opening. This embodiment advantageously prevents the coupling means from being pulled out of the opening of the carrier element as a physical and/or geometrical dimension of the securing unit is larger than the opening, thereby preventing the securing units to pass through the opening and therefore, assuring the relative position of the coupling means relative to the opening of the carrier element.

By way of another embodiment of the apparatus, the securing unit and the opening are configured as a positive locking connection. Thus, the positive locking connection is generated by the opening and the securing unit intertwining, in particular the securing unit engaging the opening. Thus, a decoupling of the coupling means from the carrier element is prevented even in a force-free state.

According to an advantageous embodiment of the apparatus, the securing unit is built as a securing disc. Thus, the securing disc is configured to provide the coupling means from being pulled out of the opening in that the securing disc stays in contact with at least a part of the carrier element around the opening.

The securing unit may be connected to the coupling means via a locking means, in particular a screw and/or a bolt, wherein the locking means locks the securing unit to the holding region, in particular to the top of the coupling means. For example, the securing unit may be screwed into the holding region of the coupling means, wherein the holding region is located at the top of the coupling means. The locking means, i.e. the screw, provides for an axial securing force counteracting a force tending to pull the coupling means out of the opening.

According to another embodiment of the apparatus, two securing units may be provided, wherein one securing unit is located adjacent to each side of the opening. Thus, the two securing units are located opposite each other, wherein the carrier element is arranged between both securing units. By providing a securing unit at each side of the opening the relative position of the coupling means with respect to the carrier element is not only assured regarding forces tending to pull the coupling means out of the opening but also regarding forces tending to push the coupling means through the opening. In other words, by providing two securing units arranged on opposing sides of the opening, the coupling of the coupling means with the carrier element can be improved.

Advantageously, the coupling means may be built as a spindle. Thus, the driving unit may be used to drive a spindle nut driving the spindle and therefore, moving the spindle upwards and/or downwards and together with the spindle the coupled carrier element.

Additionally, the apparatus may comprise a clamping device that is configured to clamp the coupling means in the opening. The clamping device is therefore, configured to apply a clamping force on the coupling means fixing the coupling means relative to the opening.

BRIEF DESCRIPTION OF THE DRAWINGS

Exemplary embodiments of the invention are described with reference to the FIGURE. The sole FIGURE is a schematic diagram showing an inventive apparatus.

DETAILED DESCRIPTION

The sole FIGURE shows a detail of an apparatus 1 for additively manufacturing three-dimensional objects by means of successive layerwise selective irradiation and consolidation of layers of a build material which can be consolidated by means of an energy beam. The apparatus 1 comprises a carrying device 2 with a carrier element 3, e.g. carrying a build plate that carries the build material and the object to be built during a manufacturing process. It is also possible, that the carrier element carries the build material directly.

The carrier device 2 further comprises a driving unit 4, e.g. a motor, configured to drive the carrier element 3. To drive the carrier element 3 the driving unit 4 is configured to interact with a coupling means 5 that is coupled with the carrier element 3. According to this exemplary embodiment the coupling means 5 is built as a threaded spindle interacting with a spindle nut 6 that is driven by the driving unit 4. The spindle nut 6 may also be considered part of the driving unit 4, in particular the driving unit 4, the coupling means 5 and the spindle nut 6 may form a spindle drive. As the spindle nut 6 is fixed in position, e.g. to a housing of the apparatus 1, driving the spindle nut 6 results in a lateral movement of the coupling element 5. In other words, driving the spindle nut 6 applies a driving force on a driving region 7 of the coupling means 5 causing the coupling means 5 to move upwards or downwards (corresponding to the rotating direction of the spindle nut 6). The coupling means 5 further comprises a holding region 8 essentially arranged at the top of the coupling means 5. The coupling means 5 protrudes an opening 9 in the carrier element 3 with the holding region 8.

To secure the coupling of the coupling means 5 with the carrier element 3 a first securing unit 10 is provided that is locked to the coupling means 5 via a locking means 11, for example a screw. The securing unit 10 engages the opening 9, thereby generating a positive locking connection with the carrier element 3.

As can be derived from the FIGURE, a diameter 12 of the securing unit 10 is larger than a diameter 13 of the opening 9. Therefore, the securing unit 10 prevents the coupling means 5 from being pulled out of, i.e. pulled through, the opening 9 due to a driving force applied on the coupling means 5 and friction between the carrier element 3 and a housing of the apparatus 1 (not shown).

The first securing unit 10, 14 assures that the coupling means 5 cannot be pulled out of the opening 9 due to the driving force and friction between the carrier element 3 and a housing of the apparatus 1.

Additionally, the apparatus 1 comprises a clamping device 14 that is configured to apply a clamping force on the coupling means 5 clamping the coupling means 5 in the opening 9. The additional clamping force secures the coupling means 5 relative to the carrier element 3 and particularly prevents the coupling means 5 from rotating in the opening 9 relative to the carrier element 3.

The invention claimed is:

1. Apparatus (1) for additively manufacturing of three-dimensional objects by means of successive layerwise selective irradiation and consolidation of layers of a build material which can be consolidated by means of an energy beam, with a carrier device (2) with at least one carrier element (3) for carrying build material and/or at least one object to be built and a driving unit (4) configured to drive the at least one carrier element (3) by driving a spindle nut in a rotating direction, wherein the driving unit (4) is coupled with the carrier element (3) via at least one coupling means (5), characterized by at least one securing unit (10) configured to secure the coupling of the carrier element (3) with the at least one coupling means (5), wherein the securing unit (10) is configured to apply a securing force directed axially on the coupling means (5), and characterized in that the coupling means (5) is partly arranged in an opening (9) in the carrier element (3), wherein a diameter of the securing unit (10) is larger than a diameter of the opening (9).

2. Apparatus according to claim 1, characterized in that the coupling means (5) comprises a driving region (7) and a holding region (8), wherein the coupling means (5) is configured to interact with the driving unit (4) in the driving region (7) and to interact with the carrier element (3) in the holding region (8).

3. Apparatus according to claim 1, characterized in that the securing unit (10) is configured to mechanically secure the position of the coupling means (5) relative to the carrier element (3).

4. Apparatus according to claim 1, characterized in that the coupling means (5) protrudes the opening (9) of the carrier element (3), wherein the securing unit (10) is arranged adjacent to the opening (9) in a holding region (8) of the coupling means (5), wherein a driving region (7) is arranged on the other side of the opening (9) and the securing unit (10) is configured to secure the coupling means (5) from being pulled out of the opening (9) in a direction of the driving region (7).

5. Apparatus according to claim 1, characterized in that a physical and/or geometrical dimension (12).

6. Apparatus according to claim 1, characterized in that the securing unit (10) and the opening (9) are configured as positive locking connection.

7. Apparatus according to claim 1, characterized in that a holding region (8) is located in an upper region of the coupling means (5) facing the carrier element (3).

8. Apparatus according to claim 1, characterized in that the securing unit (10) is built as a securing disc.

9. Apparatus according to claim 1, characterized in that the securing unit (10) is connected to the coupling means (5) via a locking means (11), wherein the locking means (11) locks the securing unit (10) to a holding region (8).

10. Apparatus according to claim 1, characterized in that the coupling means (5) is a spindle.

11. Apparatus according to claim 1, characterized by a clamping device (14) that is configured to clamp the coupling means (5) in the opening (9).

* * * * *